United States Patent

[11] 3,550,921

| | | |
|---|---|---|
| [72] | Inventor | Nicholas N. Stephanoff<br>Haverford, Pa. |
| [21] | Appl. No. | 748,375 |
| [22] | Filed | July 29, 1968 |
| [45] | Patented | Dec. 29, 1970 |
| [73] | Assignee | Fluid Energy Processing & Equipment Company<br>Hatfield, Pa.<br>a corporation of Pennsylvania |

[54] FLUID ENERGY PROCESSING SYSTEM
8 Claims, 2 Drawing Figs.

[52] U.S. Cl. ................................................. 263/53,
263/21
[51] Int. Cl. .................................................. C04b 11/02
[50] Field of Search .......................................... 263/21A,
53, 53A; 34/57E

[56] References Cited
UNITED STATES PATENTS
3,360,870  1/1968  Stephanoff ................... 34/57E Primary Examiner—John J. Camby
Attorney—Arthur A. Jacobs ABSTRACT: This invention relates to a system for treating solid particles wherein the particles are predried and then calcined, both the predrying and calcining being effected by entrainment of the particles in heated gaseous fluids which centrifugally whirl the particles through separate annular paths and centrifugally separate the lighter from the heavier particles at each stage. The system recycles the hot exhaust gases from the calcining stage back to the predrying stage, thereby effecting greater efficiency at less cost.

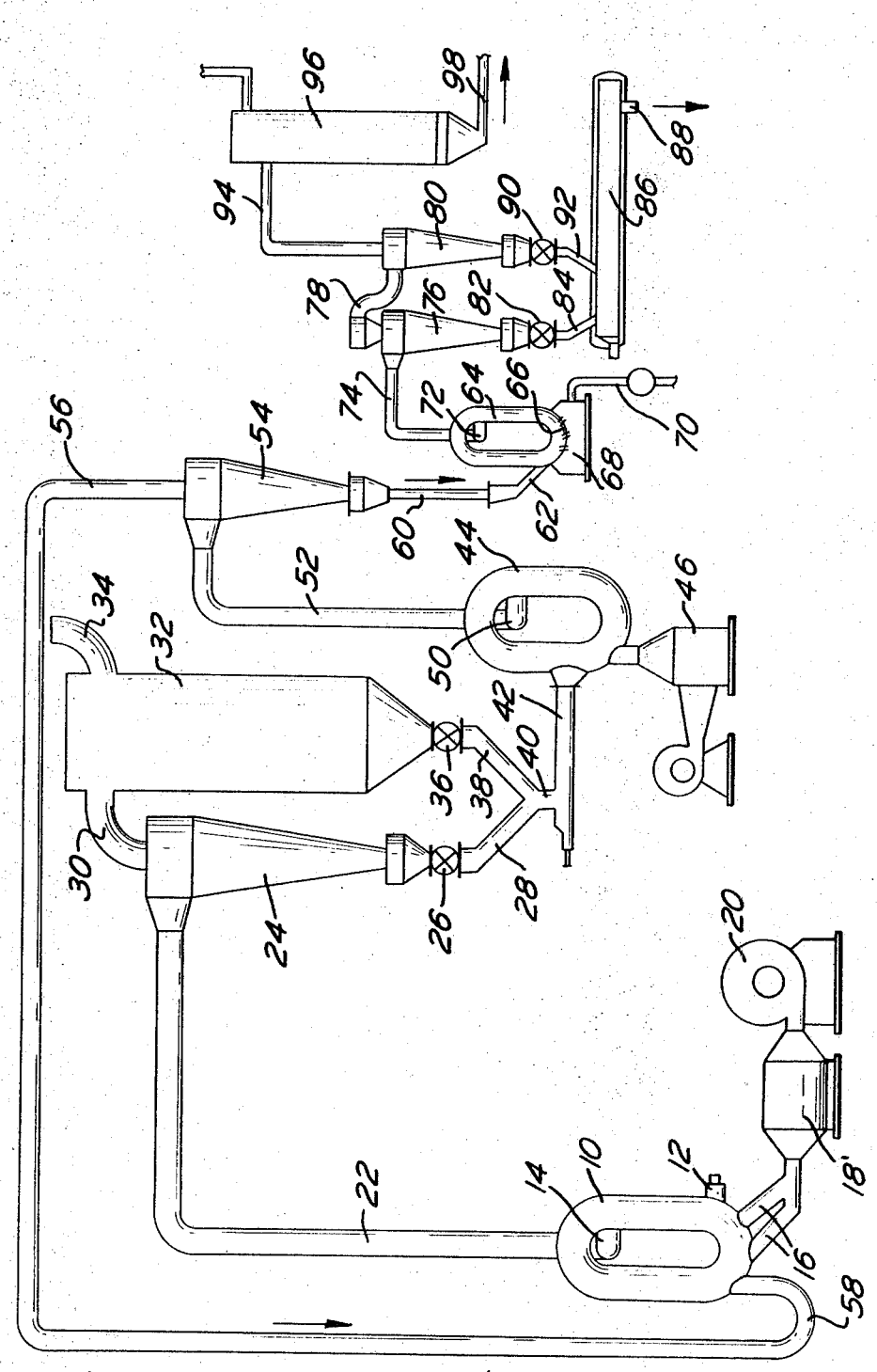
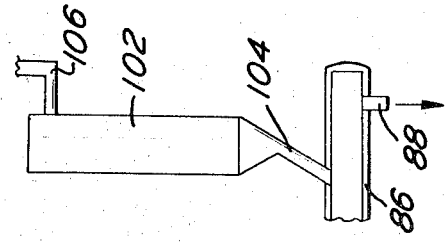
FIG. 1
FIG. 2
INVENTOR
NICHOLAS N. STEPHANOFF
BY
Arthur Jacobs
ATTORNEY

FLUID ENERGY PROCESSING SYSTEM

This invention relates to a system for drying, calcining and grinding solid particles, and it particularly relates to a system utilizing fluid energy as the operative force.

The use of fluid energy mills, utilizing high or low pressure or velocity gases or vapors to grind and/or dry solid particles is well-known. It is also known to use the process of calcination in grinding or drying processes whereby the material is heated to a high temperature below the fusing point of the material to eliminate adherent moisture or other volatile substances. However, the necessity of maintaining high temperatures both for the calcining and/or drying or grinding, has, heretofore, required the continuous input of additional heated fluid in order to maintain the high temperatures. This has, therefore, increased the cost of the process while, simultaneously, decreasing its efficiency.

In addition, where calcining has been combined with drying and/or grinding, it has, heretofore, been difficult to obtain satisfactory separation of the light particles from the heavier particles and to recycle the heavier particles without undue loss of fluid heat and energy.

A further disadvantage of most processes of this type heretofore used resided in the fact that it was necessary to remove the treated particles from one system and then place them into another system to complete the processing.

It is, therefore, one object of the present invention to provide a complete and unitary fluid energy system wherein not only is grinding, calcining and/or drying efficiently effected but wherein the process is effected in a relatively closed system and the heat and energy of the system is largely conserved.

Another object of the present invention is to provide a system of the aforesaid type which is relatively simple and which can be utilized for the variable treatment of many different types of material.

Other objects and many of the attendant advantages of this invention will be readily appreciated as the same becomes better understood by reference to the following description when read in conjunction with the accompanying drawings wherein:

FIG. 1 is a schematic view of a system embodying the present invention.

FIG. 2 is a schematic view of an alternate form of the final stage of the system.

Referring now in greater detail to the drawing wherein similar reference characters refer to similar parts, there is shown a drying mill 10 of generally oval, tubular shape, having a feed inlet 12 and an exhaust outlet 14. At the lower arcuate portion, the mill 10 is provided with tangential fluid inlets or nozzles 16, here shown as two in number although any desirable number may be used. The fluid nozzles 16 are here shown as being connected to a heater 18 having a blower 20. The fluid, may be air or any other desired gas or vapor and may be taken from the atmosphere or from any other desired source (not shown). Furthermore, instead of using a heater and blower, as at 18 and 20, the fluid may be provided from a heated tank under pressure or any other feasible source. The fluid is passed into mill 10 at relatively low pressure.

The material to be treated, which, for exemplification, is illustrated as gypsum particles, is inserted through the inlet 12 in the form of an aqueous slurry and, as it drops into the lower portion of the mill 10, it is entrained by the tangentially directed fluid from the nozzles 16 and centrifugally whirled through the upstack of the mill. During this passage through what is, in effect, an annular vortex, the particles are dried by the heated fluid (in this exemplified case, heated to about 1200° F.), and as they are heated and the adherent moisture vaporized, the particles are centrifugally separated into lighter and heavier particles. Most of the lighter particles being at the inner periphery of the annular path, pass out through the exhaust outlet 14 while the heavier particles on the outer periphery drop through the downstack of the mill and mix with new incoming slurry for further treatment in the mill 10.

The lighter, and, therefore, more completely dried particles pass through outlet 14 and up through duct 22 into a so-called "Jet-O-Clone" collector 24. This type of collector is disclosed in U.S. Pat. No. 2,568,032. In the embodiment shown, where gypsum is being treated, although the fluid enters the mill 10 through nozzles 16 at about 1200° F., by the time it reaches the collector 24, the temperature has decreased to about 275° F. The heavier particles pass down through the collector 24 and through a motor-driven, constantly rotating rotary valve 26 into a duct 28. The rotary valve 26 is provided to prevent the cooler gaseous fluid, by itself, from passing through, this fluid normally passing upwardly through duct 30 into the top of a standard bag collector 32. The bag collector separates the lighter fines from the gaseous fluid. The fluid then passes to exhaust through duct 34 while the fines pass through rotary valve 36 similar to valve 26, into duct 38. The ducts 28 and 38 come together at a common inlet 40 leading into a pneumatic feeder 42. Although feeder 42 is here disclosed as pneumatic, a screw-type or any other desirable feeder means may be used.

The dried material is then fed by feeder 42 into a calcining mill 44. The mill 44 is similar to mill 10 except that there are no tangential fluid nozzles. Instead, heat is supplied by a heater 46 which is supplied with air or other desirable fluid by a blower 48. The particles fed into the mill by feeder 42 are then circulated through the mill 44, at the calcining temperature, (at an exemplified temperature of about 1700° F., for gypsum). The lighter particles are centrifugally separated and pass through outlet 50 into a duct 52 while the heavier particles are recycled through the downstack of the mill 44 for further calcining treatment.

The lighter particles and entraining gaseous fluid, at the calcining temperature, pass into the top of "Jet-O-Clone" collector 54. Here, the gaseous fluid passes upwardly through duct 56 and is recycled, while still very hot (about 1400°—1500° F. in the exemplification herein) back to the inlet 58 at the bottom of mill 10. This fluid is then utilizable for the drying process in mill 10 with little or no further fluid required through ducts 16. In fact, once an initial amount of fluid is passed through ducts 16, it is often possible to thereafter shut down the heater 18 and blower 20 until it is necessary to restart the system after it has been stopped.

Alternatively, the heater 18 and blower 20 may be entirely eliminated and only the heater 46 and blower 48 used. In such instance, the system is started by starting the heater 46 and blower 48 and permitting the hot fluid to flow through the mill 44 and duct 56 into the mill 10. The materials to be treated can then be fed into the mill 10 and the operation begins, utilizing residual calcining heat.

The solids which pass down from collector 54 pass through a duct 60 into the inlet 62 of a grinding mill 64. The solids passing into the mill 64 are, in many cases, primarily agglomerated particles (i.e., particles formed by agglomeration of finer particles due to the heat of calcination). These agglomerated particles are then ground in the mill 64, if so desired. However, the grinding mill 64 can be eliminated if the particles are of the type which do not agglomerate or are already sufficiently fine for the desired purpose.

The mill 64 has tangential fluid nozzles 66 leading from a manifold or header 68 which is supplied with high pressure fluid from a conduit 70 connected to a source of the pressure fluid (not shown). The high pressure fluid (in the exemplification herein it is steam at about 125—200 p.s.i.g.) entrains the agglomerated particles and, while centrifugally whirling them in a vortex around the mill, causes them to impact against each other, thereby causing pulverization.

The lighter and smaller particles resulting from the pulverization pass out through an outlet 72 while the heavier particles pass through the downstack of the mill for further grinding. The lighter particles, which pass through the outlet 72 then pass through the duct 74 to a "Jet-O-Clone" collector 76. From here, the still lighter particles pass upwardly through a duct 78 to a similar "Jet-O-Clone" collector 80 while the less lighter particles pass down through a motor-driven, constantly rotating rotary valve 82 and through a duct 84 into a collecting cooler 86 having an outlet 88. The particles which pass into the collector 80 are almost all passed down through the rotary valve 90, similar to valve 82, and duct 92 into the cooler 86, while the remaining gaseous fluid, containing only a very small residual amount of the solid particles, is passed through a duct 94 into a condenser 96 of standard design. Here the gaseous fluid is condensed and passes out through duct 98 to a settling tank or the like (not shown).

In FIG. 2 there is shown an alternative form of the final stage where, instead of the condenser 96, there is provided a standard type of bag collector 102 wherein the collected fines are removed from the fluid and pass through the duct 104 into the cooler 86. The gaseous fluid is exhausted through duct 106 either to waste or to a condenser such as condenser 94.

Obviously, many modifications of the present invention are possible in the light of the above teachings. It is, therefore, to be understood that within the scope of the appended claims, the invention may be practiced otherwise than as specifically described.

I claim:

1. A fluid energy processing system for solid particles comprising a drying mill and a calcining mill in series, each of said mills comprising a fluid energy mill wherein a gaseous fluid is projected tangentially into an annular path and wherein the solid particles are entrained in said gaseous fluid and centrifugally whirled through said annular path while the lighter particles are centrifugally separated from the heavier particles and projected through said system, feed means in said drying mill for feeding said particles into said system, fluid inlet means in said calcining mill, said fluid inlet means being operatively connected to a source of heated fluid, means for propelling said fluid from said fluid inlet means through said calcining mill, and recycling means connected between said calcining mill and said drying mill, said recycling means being constructed and arranged to pass exhausted fluid from said calcining mill into said drying mill during the operation of said mills.

2. The system of claim 1 wherein a grinding mill is in series with the calcining mill, said grinding mill comprising a fluid energy mill wherein a gaseous fluid under high pressure is projected tangentially into an annular path to entrain said particles passing from said calcining mill and impact said particles with each other under the action of centrifugal force.

3. The system of claim 1 wherein said drying mill is provided with fluid inlet means operatively connected to a corresponding source of heated fluid, and means for propelling said last mentioned fluid through said drying mill.

4. The system of claim 1 wherein centrifugal separating and collecting means are provided between the outlet of the drying mill and the inlet of the calcining mill.

5. The system of claim 2 wherein the outlet of the grinding mill is operatively connected to a cooled collecting means for the solid particles passing therefrom and a condensing means for the gaseous fluid passing therefrom.

6. The system of claim 2 wherein the outlet of the grinding mill is operatively connected to a cooled collecting means for the solid particles passing therefrom and to a separator and collector unit for the gaseous fluid passing therefrom, said separator and collector unit being constructed and arranged to separate any remaining solid fines from the gaseous fluid, and conduit means connecting said separator and collector unit to said cooled collecting means for passing said fines to said collecting means.

7. A method of processing solid particles which comprises passing said particles through a drying stage wherein said particles are dried while being centrifugally whirled through an annular path by heated gaseous fluid under pressure, centrifugally separating the dried smaller particles from the larger particles, passing said smaller particles through a calcining stage wherein said particles are calcined while being centrifugally whirled through a second annular path by gaseous fluid heated to the calcining temperature of said particles, centrifugally separating the calcined smaller particles and entraining fluid from the larger particles, and then separating said entraining fluid from said smaller particles and recycling said entraining fluid back to said drying stage while passing said lighter particles to a further stage.

8. The method of claim 7 wherein said further stage is a grinding stage wherein the particles are centrifugally whirled through an annular path by high pressure gaseous fluid to effect impacts between said particles sufficient to cause pulverization thereof, and then separating the resulting particles from the entraining fluid.